US005117632A

United States Patent [19]

Strenzke

[11] Patent Number: 5,117,632

[45] Date of Patent: Jun. 2, 1992

[54] METHOD OF OPERATING A DRIVE UNIT

[75] Inventor: Hilmar Strenzke, Aschaffenburg, Fed. Rep. of Germany

[73] Assignee: Linde Aktiengesellschaft, Fed. Rep. of Germany

[21] Appl. No.: 498,026

[22] Filed: Mar. 23, 1990

[30] Foreign Application Priority Data

Apr. 10, 1989 [DE] Fed. Rep. of Germany ....... 3911708

[51] Int. Cl.[5] ....... F16D 31/00

[52] U.S. Cl. ....... 60/327; 60/431; 60/433; 60/434

[58] Field of Search ....... 60/431, 433, 434, 327

[56] References Cited

U.S. PATENT DOCUMENTS 3,927,528 12/1975 Van Der Kolk et al. ....... 60/431
3,986,358 10/1976 Hoffmann ....... 60/431
3,999,386 12/1976 Crull et al. ....... 60/431 X
4,274,257 6/1981 Kock, Jr. et al. ....... 60/431
4,400,935 8/1983 Louis ....... 60/431
4,445,329 5/1984 Drisko ....... 60/431
4,459,806 7/1984 Falk ....... 60/431 X
4,531,431 7/1985 Dreher et al. ....... 60/431 X
4,534,707 8/1985 Mitchell ....... 60/431 X
4,697,418 10/1987 Okabe et al. ....... 60/434
4,763,473 8/1988 Ziplies et al. ....... 60/431
4,838,755 6/1989 Johnson et al. ....... 60/431 X
5,003,776 4/1991 Kanai et al. ....... 60/434

*Primary Examiner*—Edward K. Look
*Assistant Examiner*—Todd Mattingly
*Attorney, Agent, or Firm*—Webb, Burden, Ziesenheim & Webb

[57] ABSTRACT

In a method for operating a drive unit comprised of an internal combustion engine and a hydraulic aggregate group, the amount of fuel supplied to the engine is limited by a proportionally acting RPM regulator. When the engine is overloaded the power absorption of the hydraulic aggregate group is reduced by an electronic maximum load regulator and under no-load operation the engine is shifted from an automatic idling circuit to the idling speed after a specified time and the power absorption of the aggregate group is reduced to a minimum. For partial-load operation, the power absorption of the aggregate group can be limited selectably to a power below the maximum power put out by the engine. In order to render such a process more economical, the engine is operated in the range of the idling control characteristic during partial-load operation. The output power of the hydraulic aggregate group and the output power of the engine is thus reduced, by which the hydraulic aggregate group can continue to operate with an approximately constant speed in spite of the reduced power.

6 Claims, 2 Drawing Sheets

METHOD OF OPERATING A DRIVE UNIT

BACKGROUND OF THE INVENTION

1. Field of the Invention

The invention is directed to a method for operating a drive unit which has an internal combustion engine and a hydraulic aggregate group such as pumps, wherein the amount of fuel supplied to the engine is controlled by a proportionally acting speed regulator. The power consumption of the hydraulic aggregate group is reduced by an electronic maximum load regulator when the engine is overloaded. When the engine is under no-load conditions, the engine speed is adjusted by an automatic idling circuit to the idling RPM and at the same time the power consumption of the aggregate group is reduced to a minimum after an arbitrary period of time. For partial-load operation, the power consumption of the aggregate group is selectively limited to a level below the maximum output of the engine.

2. Related Prior Art

A method as described above is disclosed in U.S. Pat. No. 4,763,473, issued Aug. 16, 1988. The functions, diesel overload protection, automatic idling circuit and power limitation, are monitored and regulated by a microprocessor. Adjustable hydraulic pumps are provided for the power limitation. The pumps are adjustable in accordance with power curves, in which case the choice of the power curves is made by program selection on the microprocessor and lower power ranges of the adjustable pumps can be set by proportional valves. The power limitation takes place through a hydraulic power regulator, which is expensive, while the diesel engine puts out unchanged power. The automatic idling circuit described in the aforementioned United States patent does not serve in the capacity of a power limitation of the diesel engine when a power limitation of the entire drive unit is desired.

The present invention avoids the abovementioned disadvantage and offers a method of the type in question, which operates more economically.

SUMMARY OF THE INVENTION

The problem is solved according to the invention by operating the engine in the region of the idling control characteristic during partial-load operation. In the region of the idling control characteristic, i.e., in the range between an arbitrarily selected rated RPM, wherein a certain power is put out by the engine during loading, and the -upper idling speed, i.e., the RPM that the engine attains at the selected rated RPM without load, the amount of fuel, and thus the output power is reduced to a minimum to prevent the engine from being damaged by high-speed operation with no load.

Through the partial-load operation of the engine in this range according to the invention, the output power of the hydraulic aggregate group and the output power of the engine are reduced and the energy is reduced. This method is particularly advantageous because the hydraulic aggregate group connected to the engine can still be operated with an approximately constant speed in spite of reduced power. If the power limitation were to be achieved by reducing the RPM, the working speed of the hydraulic aggregate group would also be reduced.

It is particularly advantageous, according to another embodiment of the invention, if the working RPM of the maximum load regulator is set at a value corresponding to a desired power output of the engine between the nominal speed and the upper idling speed during partial-load operation. The power limitation takes place through an existing electronic RPM regulator and an expensive hydraulic power limitation is eliminated.

In the operation of the hydraulic aggregate group by a diesel engine with an injector, it is favorable to regulate the amount of fuel injected with a final RPM control element which is controlled electrically by the automatic idling circuit and by the maximum load regulation and the power limitation. These functions can be realized with very little expense because the electric final RPM control element required for the automatic idling circuit is also used for regulating the amount of fuel injected and for the power limitation and the maximum load regulation.

One further refinement of the invention allows the automatic idling circuit to operate as a function of the variation spread of the actual RPM of the engine and to adjust the idling speed in a time-delay manner in the case of a small variation spread. The pause of the driver is detected from the actual RPM of the engine. The RPM fluctuates substantially during a working cycle, e.g., in a hydraulic dredger, but on the other hand does not vary without a load. If switching to the idling speed occurred, there is a switch to the originally set RPM when this RPM drops due to the loading of the load consumer. In the case of the idling speed, both the lower and the upper idling speed can be involved.

The invention will be explained in greater detail in connection with the figure of drawing.

DESCRIPTION OF A PREFERRED EMBODIMENT

Figure 1:
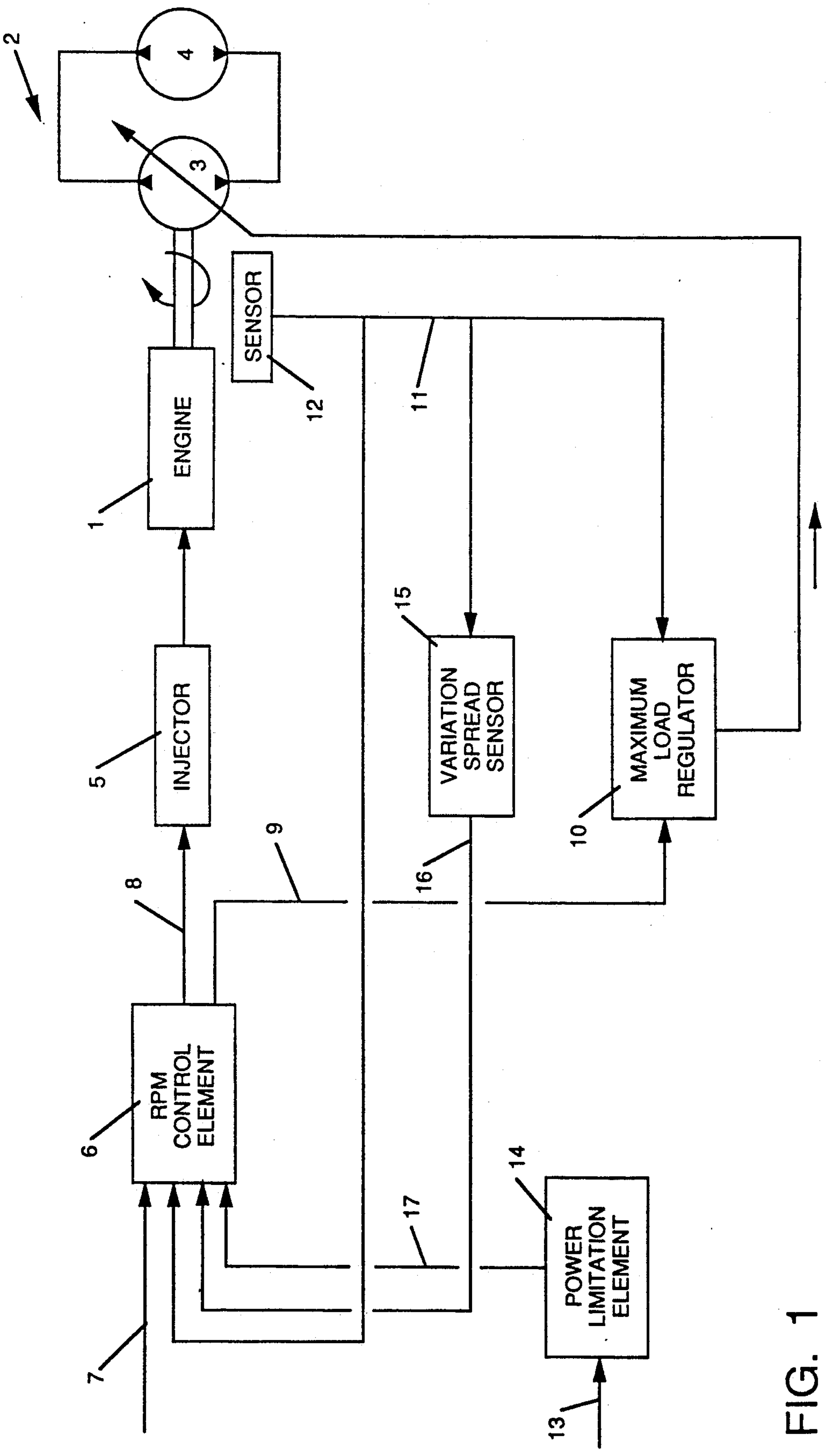
FIG. 1 shows a control system for carrying out the invention.

FIG. 1 of the drawings shows an internal combustion engine 1 which may be a diesel driving a hydraulic aggregate group 2 which consists of a variable displacement hydrostatic pump 3 in flow connection with a fixed displacement hydrostatic motor 4. The power output of engine 1 depends on the supply of fuel supplied to the engine by an injector 5. Injector 5 is controlled by a final RPM control element 6 which receives a first signal 7 which is a rated RPM selected by the machine operator. The final RPM control element 6 responds to operator signal 7 to send a signal 8 to injector 5 to determine the amount of fuel injected into the combustion chambers of engine 1 and which corresponds to the desired RPM at which the engine has a certain power output. The final RPM control element 6 also sends a signal 9 to a maximum load regulator 10. The signal 9 is the working signal for maximum load regulator 10 which compares signal 9 with signal 11 which is provided by a sensor 12 which detects the actual value of the RPM of engine 1.

In case the actual RPM of engine 1 is below the RPM signal value, the power consumption of hydraulic aggregate group 2 is reduced by a signal sent from maximum load regulator 10 to the control element (not shown) of variable displacement hydraulic pump 3. The signal 11 is also sent to the final RPM control element 6 for the purpose described hereinafter. In case the RPM selected by the operator is the nominal speed at which engine 1 has its maximum power output and in case the hydraulic aggregate group does not use the power, i.e., the engine is running under no-load conditions, the RPM of the engine can increase to a speed at which the engine could be damaged. This is avoided by final RPM control element 6 which receives the signal 11 which is the actual value of the RPM of engine 1 as a second signal and reduces the amount of fuel supplied to the engine by injector 5 so that an upper speed of the engine is not exceeded. This upper speed of the engine is called the upper idling speed. The range between the engine nominal speed and the engine upper idling speed is the upper idling speed range.

According to the present invention, if a power limitation is required, the operator provides a signal 13 to a power limitation element 14 which sends an RPM signal 17 to the final RPM control element 6. The RPM signal 17 defines the working RPM of the engine in the range between the nominal speed of the engine and upper idling speed of the engine at which a signal 8 defining a certain amount of fuel is sent to fuel injector 5 which supplies a controlled amount of fuel to engine 1 so that the engine operates with a certain power output.

According to a refinement of the invention, the signal 11 is also transmitted to a variation spread sensor 15 which detects whether the operator is controlling the engine. If the load, and as a result the actual RPM value does not vary, a signal 16 is sent to the final RPM control element 6 causing an automatic switch to a lower or higher idling speed at which the consumption of fuel is low. In this case, the final RPM control element 6 sends the idling speed as working RPM to a maximum load regulator 10. Thus, whether the actual RPM drops due to the loading of the load consumer, it is detected. If the RPM drops, there is a switch to the originally set RPM which is set by a signal 7 or a signal 13.

Figure 2:
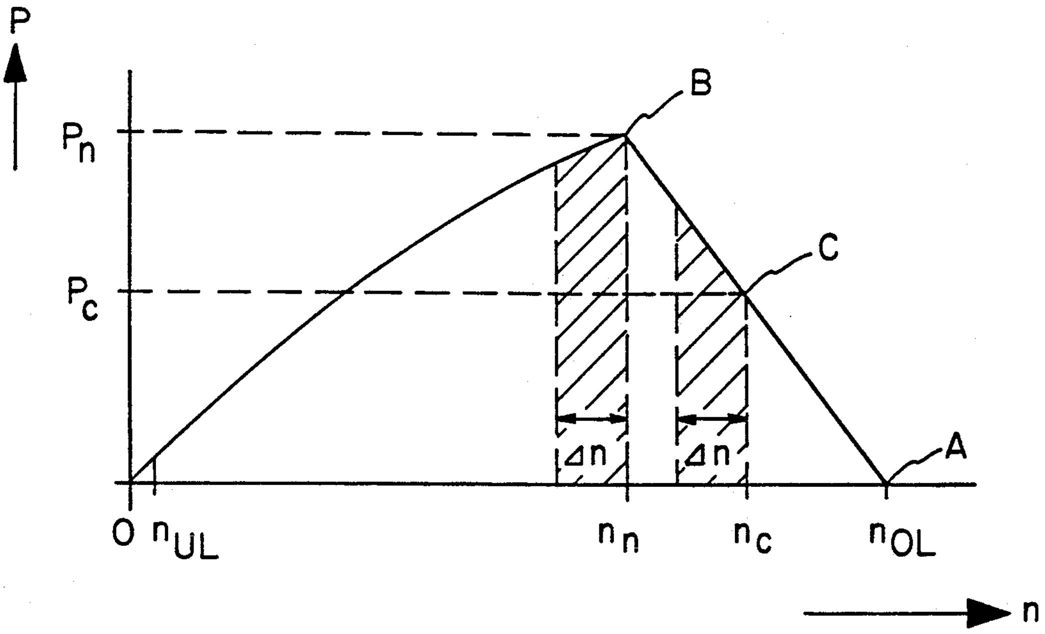
FIG. 2 of the drawings shows a plot of the characteristic RPM curve of a diesel engine with the RPM plotted on the abscissa and the power output plotted on the ordinate.

FIG. 2 of the drawings shows a plot wherein rated RPM is prescribed, e.g., in the case of a desired full power output (point B), the nominal speed is $n_n$. As long as the diesel engine runs without load, i.e., no power is absorbed (point A), the RPM is above the nominal speed $n_n$ in the so-called upper idling speed $n_{OL}$. The range between B and A is designated as the idling control characteristic. The amount of fuel injected by the injector is reduced in this range from a maximum value at point B to a minimum value at point A to prevent the RPM from rising above $n_{OL}$ which could result in the destruction of the diesel engine. Only when the diesel engine is loaded so heavily on the consumer side that it puts out its maximum possible power, i.e., the power absorption of the hydraulic aggregate group reaches the set power output of the diesel engine, the RPM will decrease to the nominal speed $n_n$.

If the engine is loaded even more heavily, its actual RPM drops below the prescribed nominal speed, so that the maximum load regulation kicks in and reduces the load on the consumer side, e.g., by reducing the delivery volume of an adjustable pump of a hydrostatic drive unit connected to the diesel engine. There is thus a stabilization of the RPM in the cross hatched range $\Delta n$ at the nominal speed $n_n$.

In the state of the art drive units, a lower power range of the adjustable pump of the hydraulic aggregate group is induced by a hydraulic power regulator for limiting the power in the hydraulic system in which case the power output of the diesel engine remains high and unchanged.

If lesser power of the diesel engine is desired for economy reasons, its RPM can be reduced to a value below the nominal speed $n_n$, but this has the disadvantage that the hydraulic aggregate group connected to the engine can no longer operate with the nominal speed. Thus, it proves advantageous to bring the RPM of the diesel engine to a value above the nominal speed $n_n$because a high working speed can be attained. For this purpose, the working RPM of the maximum load regulator is set at a value $n_C$ in the range of the idling control characteristic, which corresponds to a desired power limitation (point C). In this case, only a fraction of the amount of fuel is injected, so that a decreased power output of the diesel engine is attained.

The characteristic curve-conditioned change in RPM between the nominal speed and the upper idling speed is generally about 5–10% of the nominal speed. The regulation range of the maximum load regulator should be small relative to this narrow range of the idling control characteristic in order to obtain a power limitation that is as precise as possible. In order to achieve this result, i.e., to obtain as precise a maintenance of the desired power as possible, the hatched regulation range $\Delta n$ of the maximum load regulator must be kept as small as possible at the point $n_C$ so that the RPM pertaining to the desired power output is maintained as precisely as possible. In order to be able to reduce the precision requirement on the speed constancy, it is expedient to reduce the slope of the characteristic curve through suitable control or regulation. The same power can thus be set with lower RPM accuracy than on a steeper idling control characteristic. The point A can also be shifted to other RPM values by other suitable measures, e.g., interruption of the injector.

If the RPM of the diesel engine fluctuates only slightly over a longer period, i.e., if the actual fluctuation spread $\Delta n$ is very small in relation to the fluctuation spread possible through the maximum load regulation, it can be concluded that there is no load requirement and the driver has a pause, whereupon the RPM is returned in a time-delay manner to the lower idling speed $n_{UL}$ or the upper idling speed $n_{OL}$. A return to the originally set RPM occurs as soon as a further drop in the idling speed occurs, from which it can be concluded that a renewed load requirement has been imposed upon the engine.

While a preferred embodiment of the invention is described herein, it is to be understood that the invention may be otherwise embodied within the scope of the appended claims.

I claim:

1. A method of operating a drive unit including an internal combustion engine, a fuel injector for said engine, and a hydraulic aggregate group including a hydrostatic motor and a variable displacement pump supplying said motor, said method including controlling the power output of said engine by selecting the amount of fuel supplied to said engine from said fuel injector according to proportional RPM regulation, reducing the power consumption of said hydraulic aggregate group during overloading of said engine by an electronic maximum load regulator, automatically adjusting said engine idling speed under no-load operation to the upper idling speed after a selectively prescribed time, reducing the power consumption of said hydraulic aggregate group to a minimum wherein the power consumption of said hydraulic aggregate group is selectively limited to a power level below the maximum power output and at the nominal speed of said engine, characterized by operating said engine in the region of the idling control characteristic during partial-load operation which region is between the selected amount of fuel supplied to said engine and the upper idling speed of said engine.

2. A method according to claim 1, including setting the working RPM of said maximum load regulator at a value corresponding to a desired power output of said engine between the nominal speed and the upper idling speed during partial-load operation.

3. A method according to claim 2, including selecting the amount of fuel supplied to said engine by said injector by a final RPM control element and electrically controlling said final RPM control element by an automatic idling circuit and by the maximum load regulation and a power limitation provided by the drive unit operator.

4. A method according to claim 1, including automatic idling circuit switching as a function of the fluctuation spread of the actual RPM of said engine and setting the idling speed in a time-delay manner for a small fluctuation spread.

5. A method according to claim 2, including automatic idling circuit switching as a function of the fluctuation spread of the actual RPM of said engine and setting the idling speed in a time-delay manner for a small fluctuation spread.

6. A method according to claim 3, including automatic idling circuit switching as a function of the fluctuation spread of the actual RPM of said engine and setting the idling speed in a time-delay manner for a small fluctuation spread.

* * * * *